US008831602B2

United States Patent
Lau

(10) Patent No.: US 8,831,602 B2
(45) Date of Patent: Sep. 9, 2014

(54) CALL DELIVERY FOR A DUAL MODE DEVICE

(71) Applicant: Verizon Patent and Licensing Inc., Basking Ridge, NJ (US)

(72) Inventor: Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/729,730

(22) Filed: Dec. 28, 2012

(65) Prior Publication Data

US 2014/0038594 A1 Feb. 6, 2014

Related U.S. Application Data

(60) Provisional application No. 61/677,875, filed on Jul. 31, 2012.

(51) Int. Cl.
*H04W 40/00* (2009.01)
(52) U.S. Cl.
CPC ................................. *H04W 40/00* (2013.01)
USPC ................. 455/433; 379/221.09; 370/254

(58) Field of Classification Search
CPC ........ H04W 8/04; H04W 92/02; H04W 60/04
USPC ....................... 455/433, 445, 435.1; 370/310; 379/221.09
See application file for complete search history.

(56) References Cited

U.S. PATENT DOCUMENTS

2006/0211423 A1* 9/2006 Ejzak et al. .................... 455/445

* cited by examiner

*Primary Examiner* — Phuoc H Doan

(57) ABSTRACT

A method may include receiving a call, at a first mobile switching center (MSC) associated with a first network, wherein the call is intended for a subscriber of services associated with a second network. The method may also include sending a first location request message to a home location register (HLR) to request location information associated with a mobile device to which the call is directed, receiving, by the first MSC, an address associated with a service control point (SCP) and determining, by the SCP, that the second network is experiencing an outage or a problem. The method may further include determining, by the SCP, whether the mobile device is registered with the first network, and forwarding the call via the first network, in response to determining that the mobile device is registered with the first network.

19 Claims, 8 Drawing Sheets

CALL DELIVERY FOR A DUAL MODE DEVICE

RELATED APPLICATION

This application claims priority under 35 U.S.C. §119 based on U.S. Provisional Patent Application No. 61/677,875, filed Jul. 31, 2012, the disclosure of which is hereby incorporated herein by reference.

BACKGROUND INFORMATION

Routing calls through networks has become increasingly complex. For example, routing calls to Internet protocol Multimedia Subsystem (IMS) subscribers typically includes routing calls to a number of components that perform various processing associated with the calls. If an IMS network element fails or the IMS network experiences an outage, the IMS network may not be able to deliver the call.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to routing calls via a second network when a problem is detected in a first network. In one implementation, if a problem is detected in the first network (e.g., an IP based network), the second network may initiate call processing to route calls intended for subscribers to the first network, and normally routed via the first network, via the second network. The alternative routing may occur in a manner that is transparent to the caller and the called party.

Figure 1:
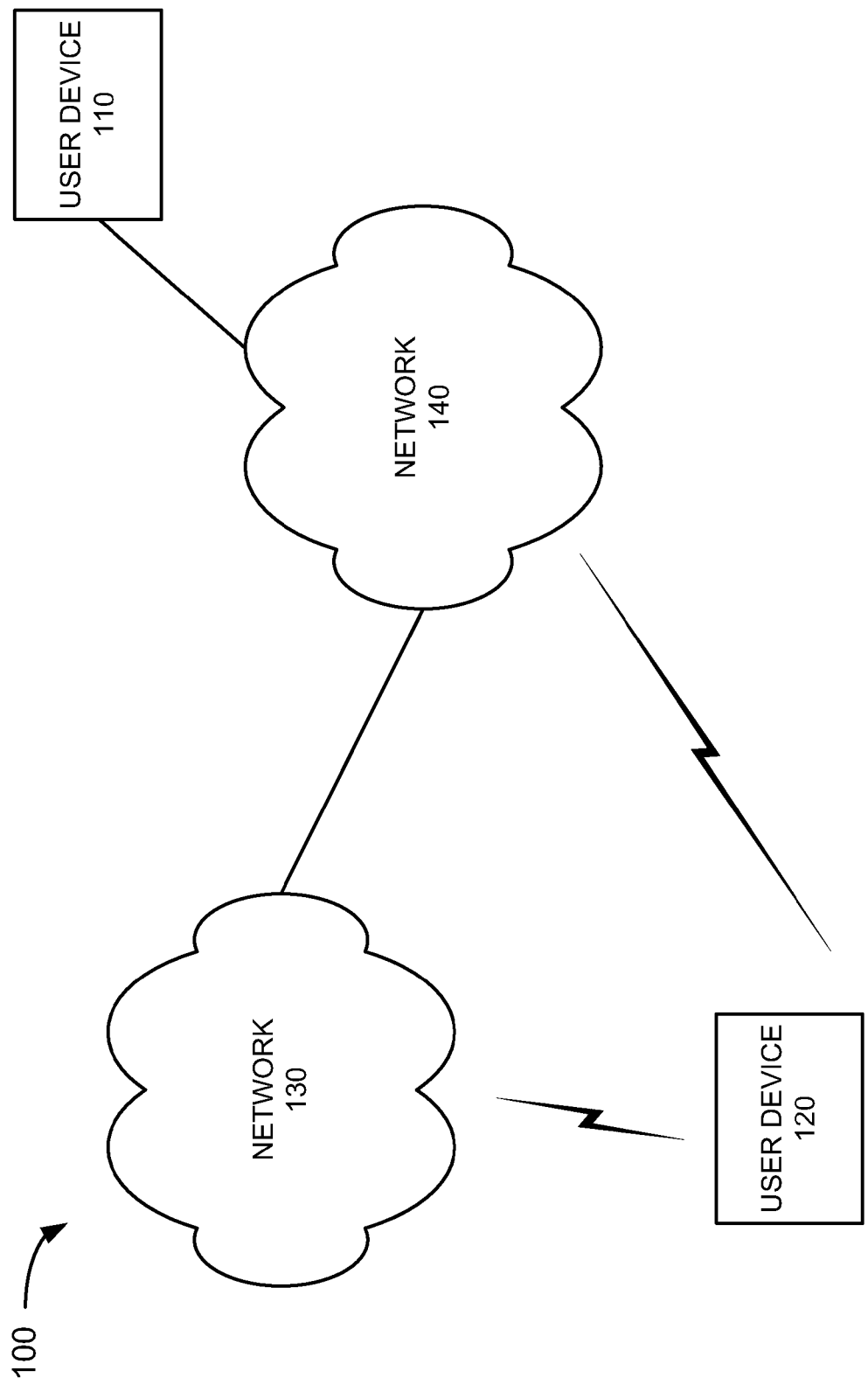
FIG. 1 illustrates an exemplary network in which systems and methods described herein may be implemented.

FIG. 1 is a block diagram of an exemplary network 100 in which systems and methods described herein may be implemented. Network 100 may include user device 110, user device 120, network 130 and network 140.

User devices 110 and 120 may each include any type of device that is able to transmit and receive data, such as text data, video data, image data, audio data, multi-media data, etc. For example, user device 110 may include some type of computer, such as a personal computer (PC), laptop computer, etc., a personal digital assistant (PDA), a web-based appliance, a mobile terminal (e.g., a cellular telephone), etc. User devices 110 and 120 may also each include a telephone, such as a public switched telephone network (PSTN) based telephone, an Internet-protocol (IP) based phone, wireless telephone, etc., used to make and receive telephone calls.

Networks 130 and 140 may each include one or more wired, wireless and/or optical networks that are capable of receiving and transmitting data, voice and/or video signals, including multi-media signals that include voice, data and video information. For example, network 130 and network 140 may each include one or more public switched telephone networks (PSTNs) or other type of switched network. Network 130 and/or network 140 may also include one or more wireless networks and may include a number of transmission towers for receiving wireless signals and forwarding the wireless signals toward the intended destinations. Network 130 and/or network 140 may further include one or more satellite networks, one or more packet switched networks, such as an IP-based network, a local area network (LAN), a wide area network (WAN), a personal area network (PAN) (e.g., a wireless PAN), an intranet, the Internet, or another type of network that is capable of transmitting data.

In an exemplary implementation, network 130 may represent a network associated with a service provider that provides various services, such as Internet-protocol (IP) related services, value added services, etc., to callers and called parties. For example, in one implementation, network 130 may represent an Internet Protocol Multimedia Subsystem (IMS) network that provides services to IMS subscribers (referred to herein as IMS subscribers or subscribers). In this implementation, network 140 may include a network that is not an IMS network, such as a code division multiple access (CDMA) network, a Global Systems for Mobile Communications (GSM) network, or another type of network (e.g., a circuit-switched network). In some implementations, the service provider associated with providing services via network 130 also provides services via network 140. In other implementations, the service provider associated with network 130 may be a different entity than the service provider associated with network 140.

The exemplary configuration illustrated in FIG. 1 is provided for simplicity. It should be understood that a typical network may include more or fewer devices than illustrated in FIG. 1. For example, two user devices 110 and 120 and two networks 130 and 140 are shown for simplicity. It should be understood that network 100 may include a large number (e.g., hundreds or thousands) of user devices and a number of other networks. Network 100 may also include additional elements, such as switches, routers, gateways, backend systems, etc., that aid in routing calls and/or information in network 100 and providing services to parties associated with user devices 110/120.

Figure 2:
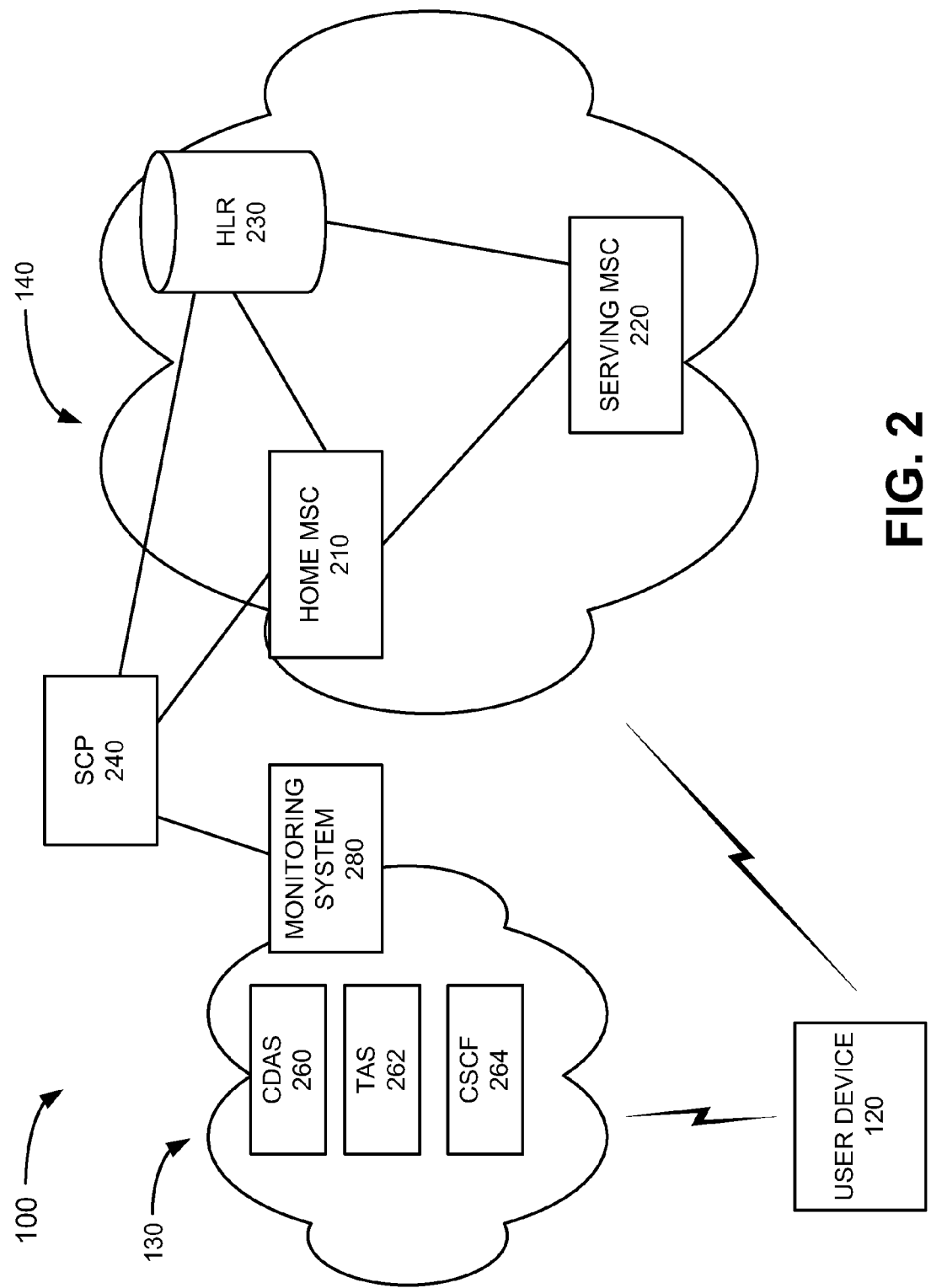
FIG. 2 illustrates exemplary components included in the network of FIG. 1.

FIG. 2 illustrates a portion of networks 130 and 140 consistent with implementations described herein. As described above, in an exemplary implementation, network 130 may include an IMS network that provides mobile and fixed users with multimedia services. For example, the IMS network may provide voice over Internet protocol (VoIP) related processing of calls for VoIP users, such as a caller at user device 110 and/or user device 120.

Network 130 may include components used to process calls in network 140 (e.g., calls to/from IMS subscribers). For example, network 130 may include call delivery application server (CDAS) 260, telephone application server (TAS) 262, call session control function (CSCF) 264 and monitoring system 280. The number of components illustrated in network 130 is shown for simplicity. It should be understood that network 130 may include additional components (e.g., a Home Subscriber Server) that aid in routing calls or other communications to customers. In addition, network 130 may include components, such as an interconnect border control function that couples network 130 to network 140.

CDAS 260 may include logic to deliver a call to a user device associated with a subscriber of IMS services and may perform all or some of the functions defined by 3GPP or 3GPP2 standards for domain selection function or a voice call continuity (VCC) server for IMS deployment, including the selection of network 130 or network 140 to deliver a call for a dual mode mobile device that may register in both network 130 and network 140. TAS 262 may include logic to provide video and/or voice services to IMS subscribers. CSCF 264 may include call session control components, such as a proxy CSCF (P-CSCF), a serving CSCF (S-CSCF) and an interrogating CSCF (I-CSCF) that control the routing of calls via network 130. In an exemplary implementation, components of network 130 may be monitored to determine whether the components are experiencing any problems, such as an overload condition, a failure, etc. When a failure or other problem that affects the routing of calls is detected by, for example, monitoring system 280, calls intended for an IMS subscriber may be routed to the IMS subscriber via network 140, as described in detail below.

Network 140 may include home mobile switching center (MSC) 210, serving MSC 220 (also referred to as visiting MSC 220) and home location register (HLR) 230. Network 100 may also include service control point (SCP) 240. SCP 240 is shown in FIG. 2 as being located outside of network 140. In some implementations, SCP 240 may be located within network 140. In other implementations, SCP 240 may be located in network 130 or may be integrated with CDAS 260.

Home MSC 210 may include one or more computing devices, such as server devices or other types of computing devices that are configured to route calls and/or obtain routing information regarding routing calls in network 140. In an exemplary implementation, home MSC 210 is associated with the telephone number (or mobile directory number (MDN)) assigned to a dual mode user device 120 so that incoming calls from the PSTN to user device 120 will be routed to home MSC 210 for call termination.

Serving MSC 220 may include one or more computing devices, such as server devices or other types of computing devices that are configured to deliver calls to particular mobile devices served by serving MSC 220. Serving MSC 220 may be located in network 140 or may be located in a different service provider's network, such as a service provider's network that allows roaming of user devices from network 140. In some cases, home MSC 210 may also act as the serving MSC for user device 120. In the implementation illustrated in FIG. 2, serving MSC 220 and home MSC 210 are located within network 140. However, in other implementations, home MSC 210 and serving MSC 220 may be located elsewhere in network 100. In each case, home MSC 210 and/or serving MSC 220 may communicate routing information and other information to aid in routing and/or delivering calls via network 140, as described in detail below.

HLR 230 may include one or more computing devices, such as servers, database systems or other types of computing devices/systems that store information associated with routing calls. For example, HLR 230 may store a mobile directory number (MDN) for each user device associated with a party who subscribes to services provided by network 140, as well as location related information to aid in routing calls via network 140. HLR 230 may communicate with home MSC 210, serving MSC 220 and SCP 240 to aid in routing calls in network 140, as described in detail below. HLR 230 may also communicate with CDAS 260 when CDAS 260 attempts to deliver calls to network 140 for user device 120, such as when user device 120 is not registered in network 130, but is registered in network 140.

SCP 240 may include one or more computing devices, such as server devices or other types of computing devices that control the routing of calls in network 100. Under normal conditions, SCP 240 may direct incoming calls for a dual mode user device to network 130 so that IMS services may be supported for these calls, and CDAS 260 may select either network 130 or network 140 to deliver the particular calls. In an exemplary implementation, SCP 240 may initiate routing of calls intended for an IMS subscriber to an alternative network, such as network 140, when a problem or failure (e.g., a critical problem) is detected in network 130, as described in detail below.

Monitoring system 280 may include one or more computing devices that monitor operations of network 130. Monitoring system 280 is shown in FIG. 2 as being located inside network 130. In some implementations, monitoring system 280 may be located outside network 130, such as at a network operations center (not shown). In each case, monitoring system 280 may monitor operations of components of network 130. When a problem or failure occurs in network 130 (e.g., CSCF 264 or CDAS 260 is not available) and the problem/failure adversely affects the IMS network 130's ability to deliver calls to an IMS subscriber, monitoring system 280 may alert operation personnel and/or automatically signal equipment in network 100 to initiate routing of calls via an alternative network (e.g., network 140), as described in detail below.

Figure 3:
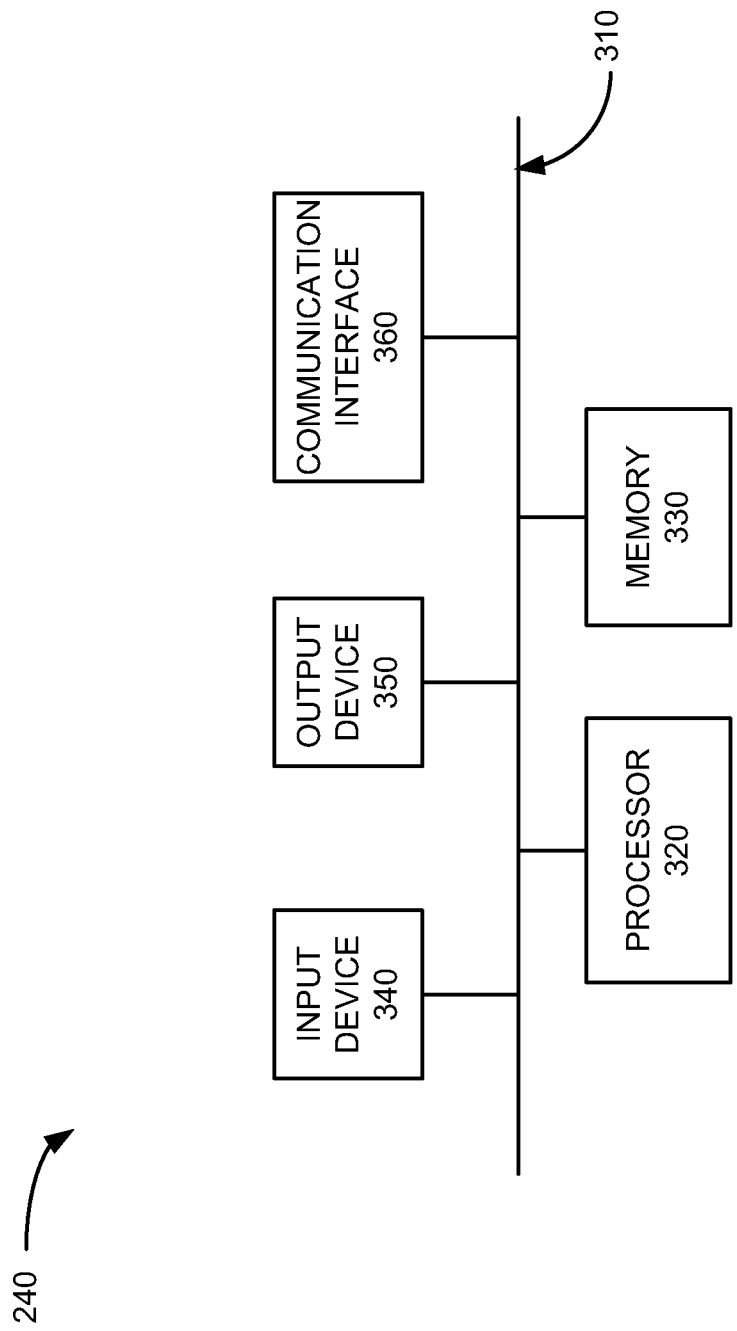
FIG. 3 illustrates an exemplary configuration of logic components implemented in one or more of the components of FIG. 2.

FIG. 3 illustrates an exemplary configuration of SCP 240. Other devices in network 100, such as home MSC 210, serving MSC 220, HLR 230, components of network 130 (e.g., CDAS 260, TAS 262, CSCF 264 and monitoring system 280) may be configured in a similar manner. Referring to FIG. 3, SCP 240 may include bus 310, processor 320, memory 330, input device 340, output device 350 and communication interface 360. Bus 310 may include a path that permits communication among the elements of SCP 240.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to SCP 240, such as a keyboard, a keypad, a mouse, a pen, a microphone, a touch screen, voice recognition and/or biometric mechanisms, etc. Output device 350 may include a mechanism that outputs information to the user, including a display, a printer, a speaker, etc.

Communication interface 360 may include a transceiver and/or interface device that SCP 240 may use to communicate with other devices (e.g., home MSC 210, serving MSC 220, HLR 230, monitoring system 280, etc.), via wired, wireless or optical mechanisms. Communication interface 360 may also include one or more radio frequency (RF) transmitters, receivers and/or transceivers and one or more antennas for transmitting and receiving RF data via network 140 and/or 130. Communication interface 360 may also include a modem or an Ethernet interface to a LAN or other mechanisms for communicating with elements in a network, such as network 140 or another network (e.g., network 130).

The exemplary configuration illustrated in FIG. 3 is provided for simplicity. It should be understood that SCP 240, and other components in network 100, such as home MSC 210, serving MSC 220, HLR 230 and monitoring system 280, may include more or fewer devices than illustrated in FIG. 3. In an exemplary implementation, SCP 240 (or other components in network 100) may perform operations in response to processor 320 executing sequences of instructions contained in a computer-readable medium, such as memory 330. A computer-readable medium may be defined as a non-transitory physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
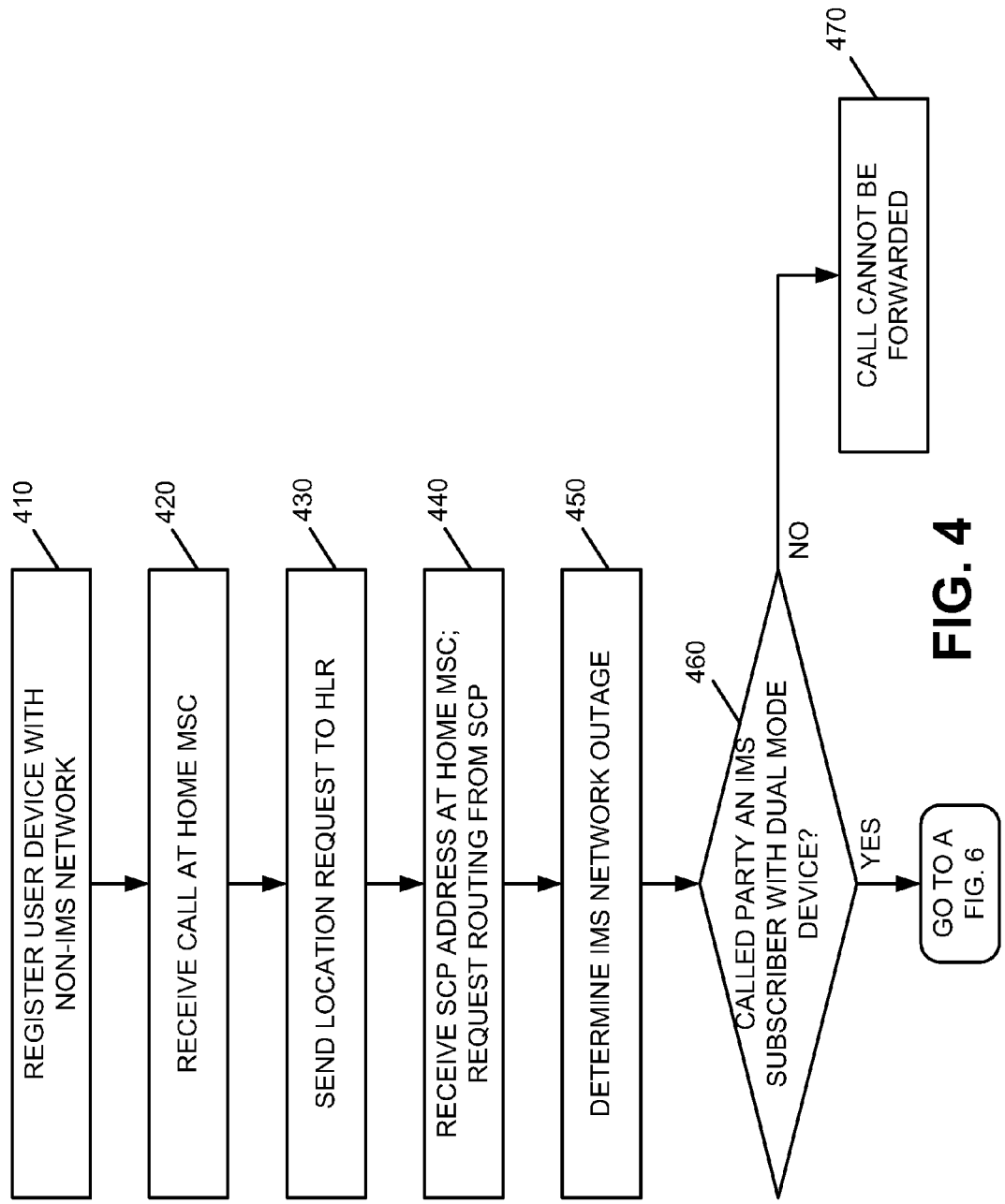
FIG. 4 is a flow diagram illustrating exemplary processing associated with the components of FIG. 2.
Figure 5:
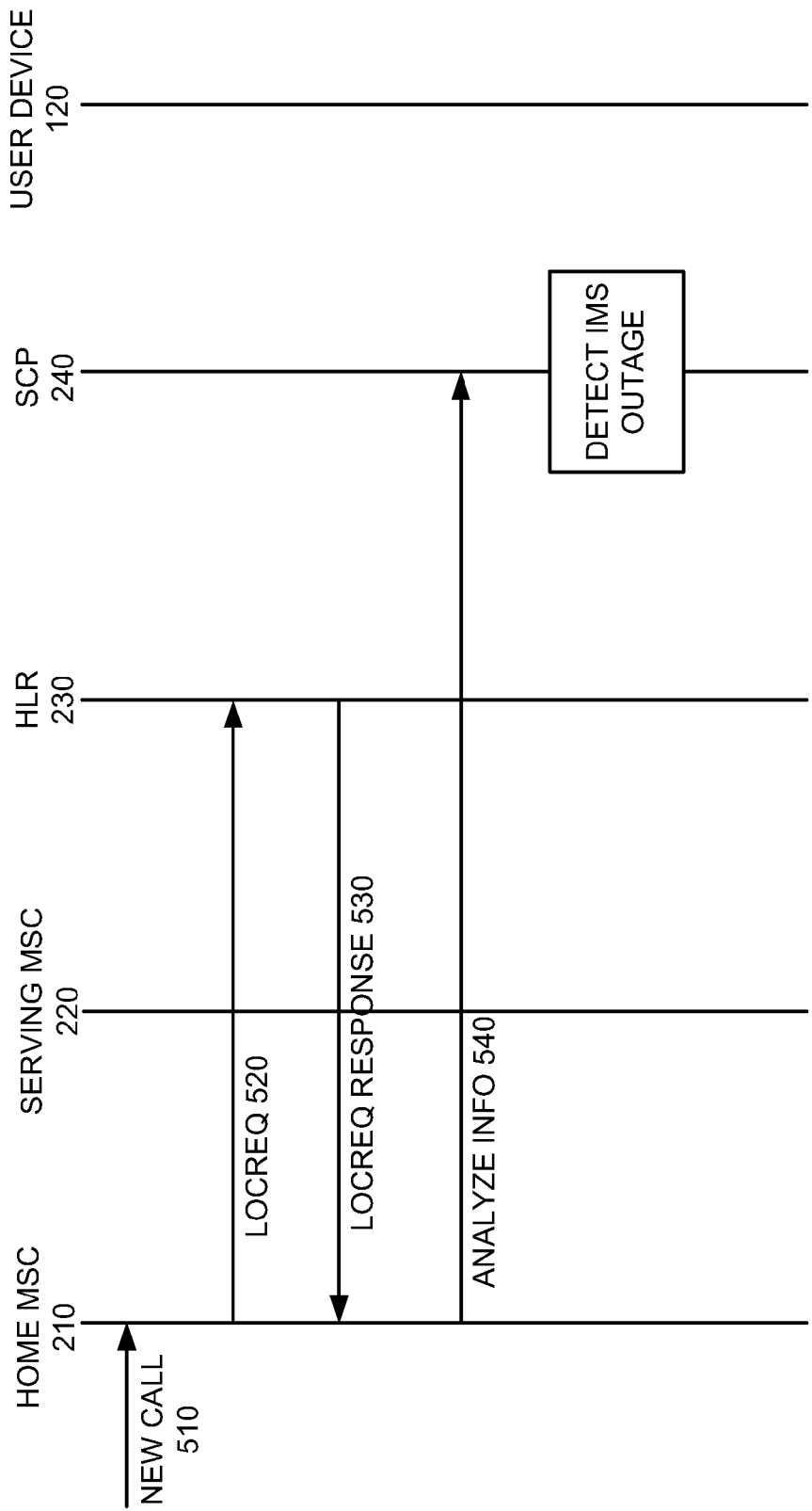
FIG. 5 is a signal flow diagram associated with the processing of FIG. 4.
Figure 6:
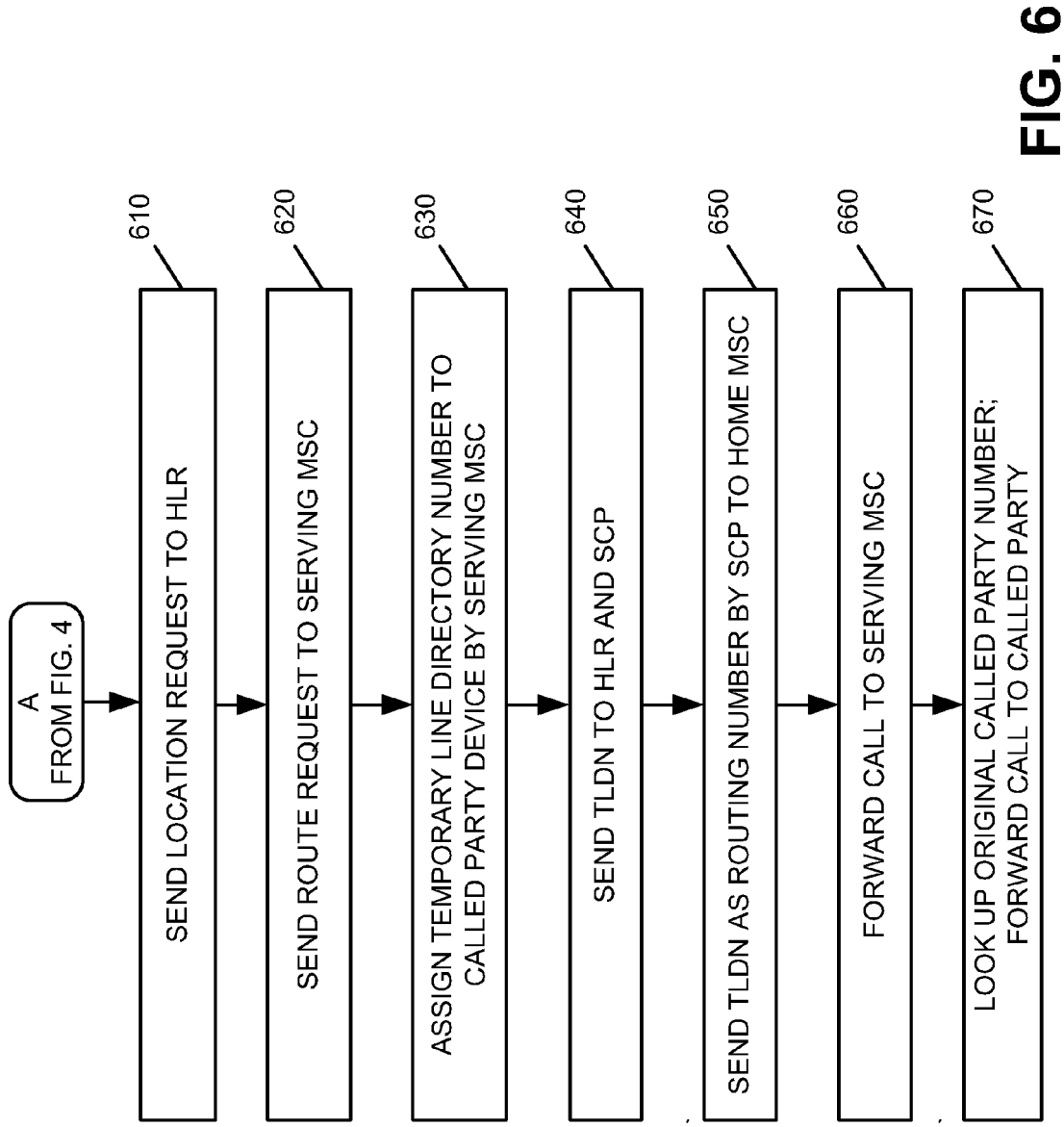
FIG. 6 is a flow diagram illustrating exemplary processing associated with routing a call through an alternative network.
Figure 7:
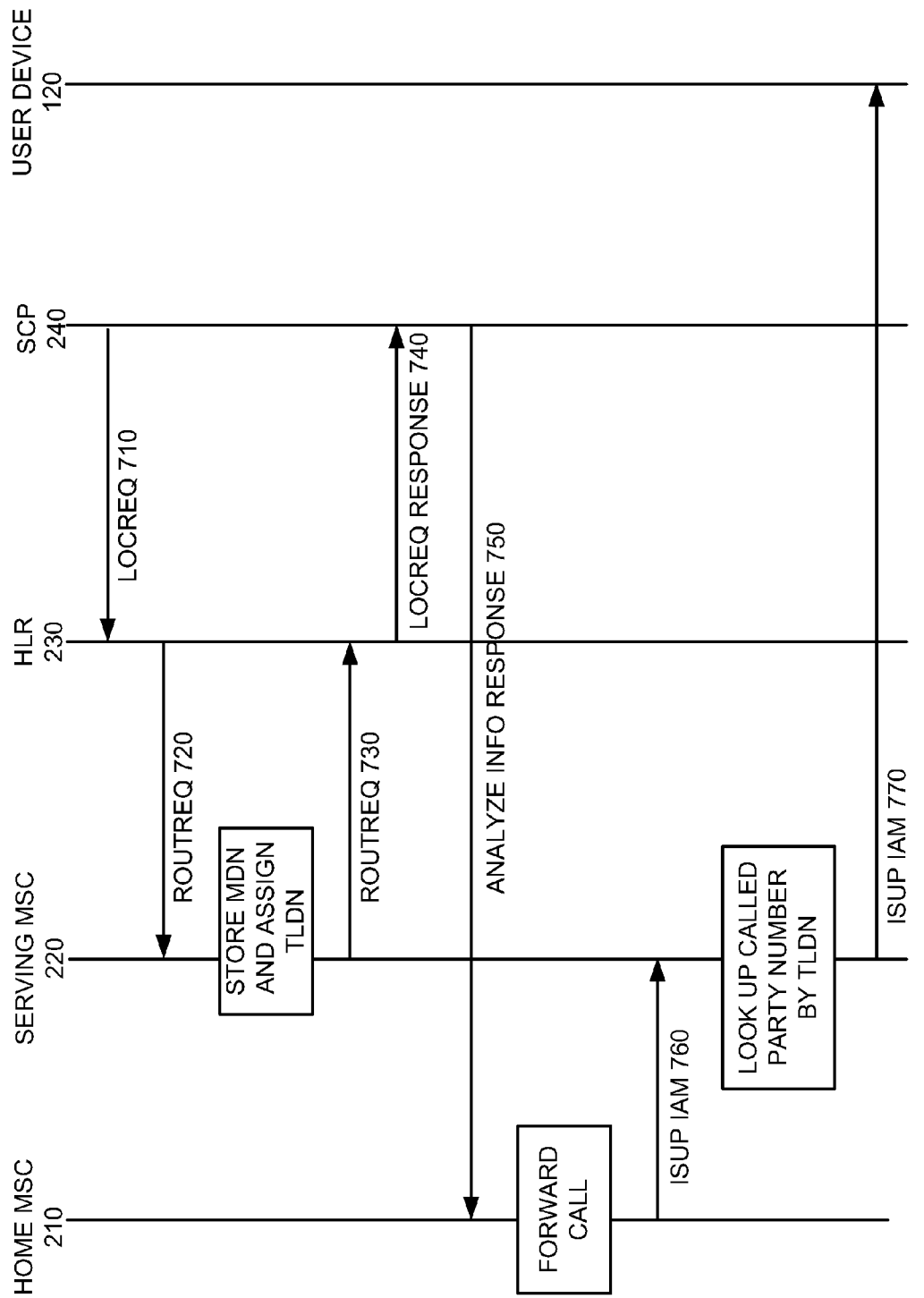
FIG. 7 is a signal flow diagram associated with the processing of FIG. 6.

FIGS. 4 and 6 are flow diagrams illustrating exemplary processing associated with network 100. FIGS. 5 and 7 are exemplary signal flow diagrams associated with the processing in FIGS. 4 and 6, respectively, and are described in conjunction with FIGS. 4 and 6. Processing may begin with user device 120 registering with network 140 (block 410). For example, assume that user device 120 is a dual mode mobile device that obtains services from a service provider associated with network 140 and has been assigned an MDN associated with home MSC 210. Further assume that the party associated with user device 120 has also subscribed to IMS services provided by network 130 (i.e., is an IMS subscriber) so that incoming calls will normally be forwarded by home MSC 210 to network 130 for processing and delivery. User device 120, being a dual mode device, may simultaneously register with network 130 (also referred to as IMS network 130) and network 140, or may only register with one or none of these networks, depending on network coverage availability at the physical location of user device 120. In some implementations, even if user device 120 is not registered with network 130, calls can be delivered to dual mode device 120 via network 140 when a failure or problem is detected in network 130. That is, incoming calls may be delivered to the called party when network 130 is not available. In some instances, various IMS services associated with network 130, such as call termination screening provided by TAS 262 or CSCF 264 may not be supported, but the call will still be delivered to the called party via network 140.

Assume that a party at user device 110 makes a call that is intended for user device 120, which is a mobile device, and that home MSC 210 receives the call (block 420; FIG. 5A, signal 510). Home MSC 210 may send a location request to HLR 230 to query the location of the called party/user (block 430; signal 520). For example, home MSC 210 may send a location request (LOCREQ) signaling message in accordance with the American National Standards Institute (ANSI) 41 standard to HLR 230. The location request may include a mobile directory number (MDN) associated with the called user device 120 and an indication that a wireless intelligent network (WIN) trigger is supported by MSC 210. The WIN trigger may be used to indicate that the called party associated with user device 120 is an IMS subscriber and that the incoming call will be processed by IMS network 130.

HLR 230 receives the location request and identifies the address of the appropriate SCP to process the WIN trigger. HLR 230 may indicate that the called party/user, identified by the MDN, has a WIN trigger enabled for call termination and return the identified SCP address in the response to the location request to home MSC 210 (signal 530). Home MSC 210 receives the returned location information, including the information identifying the address of the appropriate SCP (block 440). In this example, assume that SCP 240 is the identified SCP provided by HLR 230.

Home MSC 210 sends a signaling message to the identified SCP (i.e., SCP 240 in this example) requesting a routing number for forwarding the incoming call to the called user device 120 (block 440). For example, home MSC 210 may send an Analyze Information request message to SCP 240, in accordance with ANSI 41 standards (signal 540). Under normal conditions, SCP 240 may return a routing number that directs home MSC 210 to route the call to IMS network 130 for processing and delivery. In this case, assume that SCP 240 detects or determines that an IMS problem or outage exists (block 450). For example, one or more components of IMS 130 may be experiencing an overload condition, a failure, etc. In some implementations, SCP 240 may be automatically notified of the problem/failure by monitoring system 280 and will automatically provide alternative routing information for routing the call via network 140. In other instances, an operator associated with SCP 240 may be alerted to the problem and manually input information to SCP 240 to initiate the alternative routing procedures.

In each case, after an IMS outage or problem is detected, SCP 240 determines if the called party is an IMS subscriber with a dual mode device that may register with another network other than IMS network 130 (e.g., a non-IMS network), such as network 140 (block 460). For example, as described above, user device 120 may be a dual mode device registered as an IMS subscriber device, while also being registered with network 140, or may be a dual mode device that is not registered with IMS network 130, but is registered with network 140.

If the called party (i.e., user device 120 in this example) is not a dual mode device and cannot register (or is not registered) with network 140 (block 460—no), the call may not be forwarded via another network (block 470). If, however, the called party (i.e., user device 120 in this example) is a dual mode device that may register (or is registered) with network 140 (block 460—yes), the incoming call may be routed via network 140, as described below with reference to FIG. 6.

Continuing with the example above, after SCP 240 receives an indication that IMS network 130 is experiencing a problem or outage, and determines that the called party is a dual mode device that may be registered with network 140, SCP 240 sends a location request to HLR 230 (FIG. 6, block 610; FIG. 7, signal 710). In the location request, SCP 240 may include the MDN for the called party at user device 120 (referred to herein as MDN B) and also indicate that WIN capability is not supported by SCP 240. This is in contrast to the location request made by home MSC 210 described above with respect to signal 520. That is, in signal 520, home MSC 210 indicated that WIN capability was supported so that HLR 230 returns the address of SCP 240 via signal 530. Since IMS 130 was determined to have a problem, SCP 240 does not return routing information to home MSC 210 for redirecting the incoming call to IMS network 130. Instead, SCP 240 sends a location request message to HLR 230 indicating that WIN capability is not supported so that HLR 230 will not return the same WIN trigger information to SCP 240 similar to the response returned to home MSC 210 in signal 530.

HLR 230 receives the location request message for MDN B along with the indication that WIN capability is not supported from SCP 240. HLR 230 may send a route request message, which may be in the format of a ROUTREQ message according to ANSI 41 standards, with MDN B to serving MSC 220 (block 620, signal 720). For example, HLR 230 may identify the current serving MSC for user device 120 based on the most recent registration from user device 120 in network 140. Serving MSC 220 receives the route request message and stores MDN B that is included in the message. Serving MSC 220 also assigns a temporary line directory number (TLDN) to user device 120 (block 630). The TLDN associated with the called user device 120 (referred to herein as TLDN D) may be used to aid in forwarding the call from home MSC 210 to serving MSC 220 for user device 120.

For example, serving MSC 220 forwards the TLDN (i.e., TLDN D) to HLR 230 (block 640, signal 730). HLR 230 forwards the TLDN D in response to the location request to SCP 240 (block 640, signal 740). SCP 240 receives TLDN D and forwards the TLDN D assigned by the serving MSC 220 as the routing number in the response message (e.g., an Analyze Info response message) to home MSC 210 (block 650, signal 750).

Home MSC 210 receives TLDN D as the routing number for forwarding the incoming call intended for the called party (i.e., user device 120). In this example, assume that ISUP signaling is used between home MSC 210 and serving MSC 220. In this case, home MSC 210 generates an ISDN User Part (ISUP) Initial Address Message (IAM) to initiate the forwarding of the call to the called party by including the TLDN in the called party address field to serving MSC 220 (block 660; signal 760). It should be understood that similar processing applies when other signaling methods are used between home MSC 210 and serving MSC 220.

Serving MSC 220 receives the ISUP IAM message from home MSC 210 and recognizes the called party address includes a TLDN. Serving MSC 220 performs a lookup to identify the original called party number (i.e., MDN B) based on the received TLDN (i.e., TLDN D) (block 670). Serving MSC 220 may identify that MDN B corresponds to TLDN D. Serving MSC 220 may also identify that MDN B corresponds to user device 120. Serving MSC 220 may then forward the ISUP IAM identifying the called party to user device 120 (block 670; signal 770). The call may then be completed to user device 120.

In this manner, calls intended for a subscriber in network 130 are handled via an alternative network when network 130 is experiencing a problem or outage. The processing from the standpoint of the calling party and called party is not impacted and the calling and called parties are not aware of any problems. In addition, the called party may receive the call in a normal manner without any noticeable delay.

Figure 8:
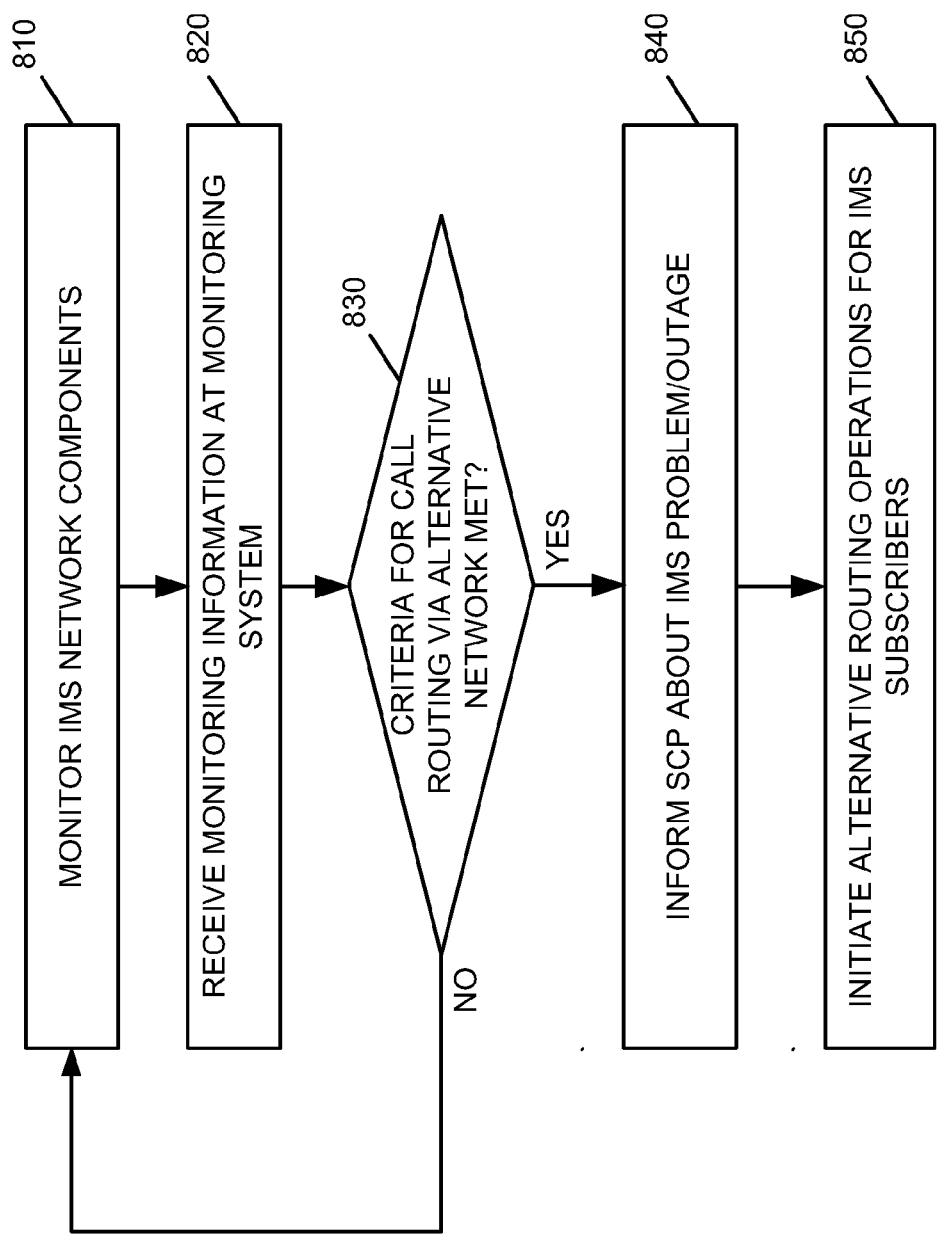
FIG. 8 is a flow diagram associated with detecting an error condition in a network.

As described above, SCP 240 may initiate alternative routing operations in response to an IMS problem or failure. FIG. 8 illustrates exemplary processing associated with detecting a failure and initiating the alternative routing. Processing may begin with monitoring system 280 monitoring system health status and collecting key performance indices (KPIs) of IMS network 130 (block 810). For example, monitoring system 280 may be associated with a network operations center and may monitor alarms and KPIs of various components in IMS network 130, such as CDAS 260, TAS 262, CSCF 264, as well as other components involved in routing calls/data to/from subscribers (e.g., Home Subscriber Server).

When any of the monitored components experience a problem, such as an overload condition, a congestion condition, a failure, etc., an alarm or failure information may be transmitted to monitoring system 280 (block 820). In some implementations, monitoring system 280 may determine whether a problem has occurred by directly monitoring components of network 130. In either case, monitoring system 280 may determine whether the monitored problem or condition satisfies the criteria to invoke call routing via an alternative network, such as the congestion or call failure rate is above a predefined threshold level (block 830). For example, monitoring system 280 may determine whether the problems being experienced by IMS network 130 are of a sufficient severity to necessitate routing calls via an alternative network. As an example, various components in IMS network 130 may be associated with KPIs. If monitoring system 280 determines that a monitored KPI is not within a predetermined range (e.g., is above or below a threshold level such that the network element may be incapable of supporting call delivery), this may indicate a problem with that network element/component. If the criteria to invoke call routing via an alternative network is not met (block 830—no), monitoring system 280 may continue to monitor IMS network 130. In this case, SCP 240 will continue allowing calls to be delivered to IMS network 130 for processing and delivery.

If, however, the monitored condition (e.g., KPI) satisfies the criteria to invoke routing the call via an alternative network (block 830—yes), monitoring system 280 may signal SCP 240 to initiate alternative routing procedures (block 840). SCP 240 receives the signal and automatically initiates alternative routing for IMS subscribers that are also registered with network 140 (block 850). That is, SCP 240 may initiate procedures to route calls via network 140, as described above with respect to FIGS. 6 and 7.

In other implementations, personnel associated with monitoring network 130 may manually initiate alternative routing procedures at SCP 240 in response to detecting the problem/failure in IMS network 130. For example, personnel may manually input information to SCP 240 to indicate that IMS network 130 is experiencing a problem and that routing of calls via network 140 should proceed for IMS subscribers that are also registered with network 140. In either case, when a problem is detected in IMS network 130, alternative routing procedures may be initiated by SCP 240 and/or other components to route the call.

Implementations described herein provide for routing calls, intended to be routed via a first network (e.g., an IP-based network), via an alternative network (e.g., a CDMA or GSM network) when a problem is detected in the first network. This may allow calls that otherwise would be dropped to be completed. In addition, the alternative routing may occur in a manner that is transparent to the caller and the called party.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, an SCP receives information indicate that a problem exists in network 130 and initiates routing via network 140. In other implementations, other devices in network 100 may detect the problem and/or initiate the alternative routing via network 140.

In addition, features have been described above with respect to monitoring device 280 detecting various types of problems in network 130. In other implementations, other devices/systems may be used to detect any type of problem in network 130 that adversely affects routing of calls via network 130. In each case, after the problem is detected, network 140 may initiate procedures to route calls associated with a dual mode device (e.g., a device that can register with and receive calls from both networks 130 and 140) via network 140.

Further, although not described above, when the problem associated with network 130 is resolved, monitoring system 280 and/or other devices or personnel in network 100 may signal SCP 240 to resume routing calls intended for IMS subscribers via network 130.

In addition, while series of acts have been described with respect to FIGS. 4, 6 and 8, and series of signal flows with respect to FIGS. 5 and 7, the order of the acts and/or signal flows may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    receiving a call, at a first mobile switching center (MSC) associated with a first network, wherein the call is intended for a subscriber of services associated with a second network;
    sending a first location request message to a home location register (HLR) to request location information associated with a mobile device to which the call is directed;
    receiving, by the first MSC, an address associated with a service control point (SCP);
    determining, by the SCP, that the second network is experiencing an outage or a problem;
    determining, by the SCP, whether the mobile device is registered with the first network; and
    forwarding the call via the first network, in response to determining that the mobile device is registered with the first network, wherein the forwarding comprises:
        transmitting, by the SCP, a second location request message to the HLR,
        transmitting, by the HLR, a mobile directory number associated with the mobile device to a serving MSC, and
        assigning, by the serving MSC, a temporary line directory number (TLDN) to the mobile device.

2. The method of claim 1, wherein the forwarding further comprises:
    sending, by the serving MSC, the TLDN to the HLR,
    forwarding, by the HLR, the TLDN to the SCP,
    forwarding, by the SCP, the TLDN to the first MSC,
    sending, by the first MSC, an ISDN user part (ISUP) initial address message (IAM) to the serving MSC, wherein the ISUP IAM includes the TLDN as the called party address, and
    receiving, by the serving MSC, the ISUP IAM.

3. The method of claim 2, wherein the forwarding further comprises:
    identifying, by the serving MSC, the mobile directory number associated with the mobile device based on the TLDN, and
    forwarding, by the serving MSC, the call to the mobile device based on the mobile directory number.

4. The method of claim 1, further comprising:
    storing, by the serving MSC, the mobile directory number; and
    storing, by the serving MSC, the TLDN as corresponding to the mobile directory number.

5. The method of claim 1, wherein the second location request message includes information indicating that wireless intelligent network (WIN) capability is not supported by the SCP.

6. The method of claim 5, wherein the first location request message includes information indicating that WIN capability is supported by the first MSC.

7. The method of claim 1, wherein the first network comprises a code division multiple access network or a Global System for Mobile Communications (GSM) network and the second network comprises an Internet protocol Multimedia Subsystem (IMS) network.

8. The method of claim 1, further comprising:
    monitoring the second network;
    detecting the outage or problem based on the monitoring; and
    automatically signaling the SCP to initiate alternative routing for mobile devices registered with the second network.

9. A system comprising:
    a first mobile switching center (MSC) configured to receive a call, wherein the call is intended for a mobile device;
    a service control point (SCP) configured to:
        initiate routing of calls intended for mobile devices served by a first network, via a second network, in response to a problem in the first network;
    a home location register (HLR) configured to:
        store information associated with mobile devices registered to receive calls via the second network,
        receive a location request associated with the call, wherein the mobile device can be served by the first network and the second network, and
        forward a routing request in response to the location request; and
    a second MSC configured to:
        receive the routing request from the HLR,
        store a mobile directory number (MDN) identifying the mobile device, and
        assign a temporary line directory number (TLDN) to the mobile device, wherein the SCP is further configured to:
  receive the TLDN, and
  forward the TLDN to the first MSC.

10. The system of claim 9, wherein the first MSC is further configured to forward the call to the second MSC, wherein the forwarded call includes information identifying the TLDN as the called party address, and
  wherein the second MSC is configured to:
    identify the MDN based on the TLDN, and
    forward the call to the mobile device based on the MDN.

11. The system of claim 10, wherein when forwarding the call, the second MSC is configured to:
  forward an ISDN user part (ISUP) initial address message (IAM) to the mobile device.

12. The system of claim 9, wherein the location request includes information indicating that wireless intelligent network (WIN) capability is not supported by the SCP.

13. The system of claim 9, wherein the second MSC is further configured to:
  store information indicating that the TLDN corresponds to the MDN.

14. The system of claim 9, wherein the first network comprises an Internet protocol based network and the second network comprises a code division multiple access network or a Global System for Mobile Communications (GSM) network.

15. The system of claim 9, further comprising:
  a monitoring device configured to:
    monitor the first network,
    detect the problem in the first network based on the monitoring, and
    automatically signal the SCP to initiate routing of calls intended for mobile devices that are normally routed via the first network, via the second network, in response to the detected problem in the first network.

16. A method, comprising:
  receiving a call at a first mobile switching device, wherein the call is intended for a mobile device associated with a subscriber of a first network;
  determining that the first network is experiencing a problem;
  determining whether the mobile device is registered with a second network; and
  directing the call to be routed via the second network, in response to determining that the first network is experiencing a problem and that the mobile device is registered with the second network, wherein the directing comprises:
    transmitting, by a service control point (SCP) a location request to a home location register (HLR), wherein the location request includes a mobile directory number corresponding to the mobile device,
    transmitting, by the HLR, a routing request to a second mobile switching device, wherein the routing request includes the mobile directory number,
    assigning, by the second mobile switching device, a temporary line directory number (TLDN) to the mobile device,
    receiving, by the first mobile switching device, the TLDN,
    forwarding the call, by the first mobile switching device, to the second mobile switching device, wherein the forwarded call includes the TLDN as the called party address,
    identifying, by the second mobile switching device, the mobile directory number based on the TLDN, and
    forwarding the call to the mobile device based on the mobile directory number.

17. The method of claim 16, wherein the first network comprises an Internet protocol Multimedia Subsystem (IMS) network and the second network comprises a code division multiple access (CDMA) network or a Global System for Mobile Communications (GSM) network.

18. A method, comprising:
  receiving, by a network device, a message requesting routing information for routing an incoming call intended for a mobile device;
  determining, by the network device, that a first network is experiencing an outage or a problem;
  determining, by the network device, whether the mobile device is registered with a second network;
  initiating, by the network device, routing of the call via the second network, in response to determining that the first network is experiencing an outage or a problem and that the mobile device is registered with the second network;
  transmitting, by the network device, a location request to a home location register (HLR); and
  receiving, from the HLR, a temporary line directory number (TLDN) assigned to the mobile device.

19. The method of claim 18, further comprising:
  forwarding, by the network device, the TLDN to a first mobile switching center associated with the second network.

* * * * *